US012583038B2

(12) United States Patent
Talgø

(10) Patent No.: US 12,583,038 B2
(45) Date of Patent: Mar. 24, 2026

(54) DEVICE FOR AXIAL DISPLACEMENT OF A HOLE SAW FOR A HAND-HELD DRILL

(71) Applicant: Talgø Teknologi AS, Sandnes (NO)

(72) Inventor: Tor Ole Talgø, Sandnes (NO)

(73) Assignee: Talgø Teknologi AS, Sandnes (NO)

( * ) Notice: Subject to any disclaimer, the term of this patent is extended or adjusted under 35 U.S.C. 154(b) by 769 days.

(21) Appl. No.: 17/793,132

(22) PCT Filed: Mar. 9, 2021

(86) PCT No.: PCT/NO2021/050060
§ 371 (c)(1),
(2) Date: Jul. 15, 2022

(87) PCT Pub. No.: WO2021/182969
PCT Pub. Date: Sep. 16, 2021

(65) Prior Publication Data
US 2023/0051583 A1 Feb. 16, 2023

(30) Foreign Application Priority Data
Mar. 9, 2020 (NO) .................................. 20200278

(51) Int. Cl.
B23B 45/00 (2006.01)
B23B 51/04 (2006.01)
B23B 51/12 (2006.01)

(52) U.S. Cl.
CPC .......... B23B 45/008 (2013.01); B23B 45/003 (2013.01); B23B 51/04 (2013.01); B23B 51/12 (2013.01); B23B 2260/0445 (2013.01)

(58) Field of Classification Search
CPC ..... B23B 45/003; B23B 45/008; B23B 51/04; B23B 51/12; B23B 2260/0445
See application file for complete search history.

(56) References Cited

U.S. PATENT DOCUMENTS

| 566,923 A | 9/1896 | Mewer |
| 3,118,325 A | 1/1964 | Pettigrew |
| (Continued) | | |

FOREIGN PATENT DOCUMENTS

| DE | 102008061183 A1 * | 6/2010 | ......... B23B 31/1238 |
| EP | 2875906 | 5/2015 | |
| (Continued) | | | |

OTHER PUBLICATIONS

Norwegian Search Report for 20200278, dated Oct. 2, 2020.
(Continued)

*Primary Examiner* — Eric A. Gates
(74) *Attorney, Agent, or Firm* — Andrus Intellectual Property Law, LLP

(57) ABSTRACT

A device is for an axial displacement of a hole saw for a hand-held drill, wherein the hole saw is coupled to the drill by a drive shaft, and the hole saw and an actuator are rotatably connected and positioned in a housing with a coupling for the drill. The actuator has an outer threaded portion which corresponds to an inner threaded portion in the housing so that the actuator and the hole saw are displaced axially along the drive shaft when the actuator rotates relative to the housing. The actuator is connected to the drive shaft via a slip clutch arranged to transfer and reduce a reduced torque from the drive shaft to the actuator.

14 Claims, 5 Drawing Sheets

(56)                    References Cited

U.S. PATENT DOCUMENTS

| | | | |
|---|---|---|---|
| 4,799,833 | A | 1/1989 | Biek et al. |
| 6,196,772 | B1 | 3/2001 | Jensen |
| 9,381,579 | B2 * | 7/2016 | Schenk ............... B23B 31/1253 |
| 9,931,710 | B2 * | 4/2018 | Becker ............... B29C 66/1122 |
| 11,213,969 | B2 | 1/2022 | Talgø |
| 2008/0296036 | A1 * | 12/2008 | Simm .................... B25F 5/001 |
| | | | 192/223 |
| 2022/0080613 | A1 | 3/2022 | Talgø |

FOREIGN PATENT DOCUMENTS

| | | | |
|---|---|---|---|
| FR | 3066941 A3 * | 12/2018 | ............... B25F 3/00 |
| JP | S4873382 | 9/1973 | |
| NO | 342671 | 6/2018 | |
| WO | 2018222050 | 12/2018 | |

OTHER PUBLICATIONS

The International Search Report and Written Opinion for PCT/NO2021/050060, dated Jun. 10, 2021.

Response to the Written Opinion for PCT/NO2021/050060, dated Dec. 17, 2021.

The Second Written Opinion for PCT/NO2021/050060, dated Mar. 16, 2022.

Response to the Second Written Opinion for PCT/NO2021/050060, dated Apr. 11, 2022.

International Preliminary Report on Patentability for PCT/NO2021/050060, dated Apr. 21, 2022.

* cited by examiner

DEVICE FOR AXIAL DISPLACEMENT OF A HOLE SAW FOR A HAND-HELD DRILL

CROSS-REFERENCE TO RELATED APPLICATIONS

This application is the U.S. national stage application of International Application PCT/NO2021/050060, filed Mar. 9, 2021, which international application was published on Sep. 16, 2021, as International Publication WO 2021/182969 in the English language. The International Application claims priority of Norwegian Patent Application No. 20200278, filed Mar. 9, 2020. The international application and Norwegian application are both incorporated herein by reference, in entirety.

FIELD

The invention concerns a device for an axial displacement of a hole saw for a hand-held drill, wherein the hole saw is coupled to the drill by a drive shaft, and the hole saw is arranged for an axial displacement along the drive shaft. More specifically, the invention concerns a device for displacing the hole saw automatically when the drive shaft rotates.

BACKGROUND

Craftsmen, for example plumbers, need to drill holes in curved surfaces, for example a water pipe in a building to install a nozzle or a valve on the pipe. For pipes arranged to transport a fluid, it is especially important that the hole to be drilled through the wall of the pipe, is perpendicular to the pipe's centre axis, so that the connection between the pipe and the valve is tight.

The common practice is to drill the hole by freehand by means of a hand-held drill with a hole saw comprising a center drill bit. Pipes on which holes are to be made in connection to a sprinkler system, typically have an outer diameter of approximately 50 mm.

A challenge with prior art is how to avoid the center drill bit slipping on the surface of the pipe. The smaller the diameter of the pipe, the bigger the risk of the drill bit slipping. Applying to the pipe a small countersink by means of a prick punch may reduce the chance of the drill bit slipping. However, this requires an additional operation. Thereafter, the challenge is drilling the hole so that the hole's axis is perpendicular to the pipe's center axis.

The problem of hole-making in pipes is described as especially big when holes are to be drilled in fixedly installed pipes which are for example placed high up on a wall or on the ceiling. In such cases, the operator must often hold a drill over their head and push the hole saw through the pipe wall. Often the pipes are fastened to the wall or ceiling by suspensions which allow a certain movement of the pipe. Such movements further complicate the drilling.

Prior art describes different auxiliary tools for radial drilling. In its simplest form, an elongated holder may be used which comprises a longitudinal groove with two faces angled 45 degrees towards the surface, wherein the holder is placed against the outside of the pipe and along the pipe's longitudinal axis. The holder may comprise one or more guides with a diameter adapted to the cutting tool's diameter. The holder is usually of a low height which provides limited support for the cutting tool. The cutting tool is usually coupled to a hand-held drill. Even though the holder provides some support for the cutting tool, a hand-held drill will cause the cutting tool to exercise to a greater or lesser degree a radial pressure on the side of the guide. Over time, the guide will become worn and imprecise. The necessary pushing force on the cutting tool is obtained by the operator pressing on the drill. The holder may be held on the pipe by manual power, clamps or tongs.

For larger pipe dimensions, for example in the processing industry or the water and wastewater industry, the use of different tapping sleeves is known which are attached to a pipe by means of surrounding sleeves which are screwed or welded on to the pipe. Such tapping sleeves often comprise special tools for driving the cutting tool through the pipe wall. A tapping sleeve with a surrounding fixing often comprises several loose elements, for example bolts and nuts. What these tapping sleeves have in common, is that they are not arranged for hand-held drill machines.

The applicant's own patent document NO342671 describes a hand-held apparatus for hole-making in an elongated tubular body, wherein the apparatus comprises a housing with a center axis, a first end portion, a second end portion and a rotatable cutting tool arranged within the housing and arranged for axial displacement from a non-cutting position to a cutting position, and wherein the cutting tool's center axis and the housing's center axis are coaxial. The apparatus comprises a fixturing device for repositioning from a first inactive position to a second active position, wherein the fixturing device in the active position is arranged to hold the apparatus fixedly on the elongated tubular body. The apparatus may further comprise a device for connection with a drive means arranged for rotating the cutting tool.

The cutting tool is rotatably connected to an actuator for controllable, linear displacement of the cutting tool from the first non-cutting position to the second cutting position. The actuator is designed as a nut which surrounds the housing, and is arranged for operation by finger.

It has been shown that the finger-operated operation described in the patent document NO342671 can lead to detrimental strain on fingers and hands when the apparatus is used continually and over a long period of time. Therefore, an alternative operation of the axial displacement of the cutting tool would be favourable, to reduce the detrimental strain on the operator.

SUMMARY

The purpose of the invention is to remedy or reduce at least one of the disadvantages of prior art, or at least provide a useful alternative to prior art.

The purpose is fulfilled by the characteristics specified in the description below and the subsequent patent claims.

The invention is defined by the independent patent claim. The dependent claims define advantageous embodiments of the invention.

The invention concerns a device for an axial displacement of a hole saw for a hand-held drill, wherein the hole saw is without a center drill bit, and is directly coupled to the drill via a drive shaft which on a first end is arranged for connection to the drill and a second end is coupled to the hole saw for providing thereby a direct transfer of a torque and an rpm from the drill to the hole saw. The hole saw and an actuator are rotatably connected and positioned in a housing with a coupling for the drill. The actuator comprises an outer threaded portion which corresponds to an inner threaded portion in the housing so that the actuator and the hole saw are axially displaced along a drive shaft for the hole saw when the actuator rotates relative to the housing and the drive shaft. The actuator is connected to the drive shaft via a slip clutch arranged to transfer and reduce a reduced torque from the drive shaft to the actuator.

A displacement of the hole saw in a drilling direction is known as feeding in technical terminology. A displacement of the hole saw in a non-drilling direction is known as reversing in technical terminology. Feeding happens when the drill makes the hole saw rotate in a first direction. Reversing happens when the drill makes the hole saw rotate in an opposite second direction.

When the hole saw is coupled directly to the drill via the drive shaft as described herein, a direct drive of the hole saw may be provided, so that a torque and an rpm from the drill can be transferred directly to the hole saw without reduction. Thereby the hole saw's rpm and torque can be the same as the drill's rpm and torque, regardless of the feed rate of the hole saw.

The effect of the actuator being connected to the drive shaft via the slip clutch as described herein, is that the actuator can feed or reverse the hole saw automatically and at the same time as the drive shaft and the hole saw are rotating. That way, the operator does not have to feed the hole saw manually when drilling, which leads to substantially better ergonomics and less risk of strain injuries compared to prior art.

Since the slip clutch's torque is adjustable, the actuator's rpm and feed rate can be regulated relative to the drive shaft's rpm. A drill described herein can typically have a maximum rpm of 2000 revolutions per minute. The actuator typically has a maximum rpm of 5 to 10 revolutions per minute. The actuator may be stationary, for example when it has reached an end point.

The slip clutch is arranged to transfer a reduced rpm and torque from the drive shaft to the actuator. Thereby the hole saw can be fed automatically and at a speed which is independent from the hole saw's rpm.

The actuator's actual rpm is affected by the torque which is transferred via the slip clutch and the hole saw's feed rate. A small or reduced torque will give little or reduced slip in the slip clutch and a low or reduced feed rate. A larger torque will lead to more slip in the slip clutch and a greater feed rate when conditions are otherwise the same.

The actuator's actual rpm is also affected by the hole saw's cutting force and the resistance moment which is provided between the hole saw and the surface which is being drilled into.

When drilling radially on a round pipe, a contact surface will form between the hole saw and the pipe which varies based on the pipe's diameter and thickness and the hole saw's position in the pipe. In this case, the invention described herein will provide a constant moment and a feed rate which varies depending on the surface area of the contact surface. More specifically, this means that the feed rate is great when the contact surface between the hole saw and the pipe is small, and that the feed rate is low when the contact surface between the hole saw and the pipe is large.

When drilling on a level surface, for example a wall, a constant moment will lead to a constant feeding of the hole saw.

The cutting ability of a hole saw will reduce gradually as the hole saw is worn down. When using a normal drill, this can be compensated for by the operator applying more force on the hole saw against the surface. An increased force can maintain the feed rate through the surface, but will lead to increased friction and risk of overheating of the hole saw so that the tempering of the hole saw is ruined.

By using the device according to the invention, the hole saw's axial force against the surface can be kept constant and the feed rate can be regulated automatically. For example, a soft surface and a hole saw with sharp teeth will provide a greater feed rate than a hard surface and a hole saw with worn teeth when the axial force and the drill's rpm are the same. Gradually increased wear on the teeth will normally lead to a gradually reduced feed rate when the conditions are otherwise the same. By increasing the torque that is transferred via the slip clutch, the feed rate can be maintained.

The device described herein can transfer a constant, reduced torque. This has the advantage of the hole saw cutting into the surface with a constant, axial force. The moment can be set so that the drilling happens at an optimal and maximal rate without too much force being applied to the hole saw, which can lead to overheating and ruin the hole saw.

When an optimal moment is set, this moment can be kept and applied to a plurality of holes. Thereby the effectiveness of the drilling can be increased.

The actuator can be displaced in an axial length which typically corresponds to the difference in the axial length of the actuator's threaded portion and the axial length of the housing's corresponding threaded portion. If the housing's threaded portion is for example 30 mm and the actuator's threaded portion is for example 15 mm, the actuator can be displaced 15 mm. If the housing's threaded portion is for example 70 mm and the actuator's threaded portion is for example 20 mm, the actuator can be displaced 50 mm.

When drilling, the actuator will typically be displaced for as long as the hole saw is rotating. If the hole saw keeps rotating after the actuator has reached an end position, the slip clutch will absorb this speed difference in its entirety.

The device can comprise a means for cooling the slip clutch to prevent overheating. Such means may be a coolant, for example oil. The coolant may be supplied via a nipple arranged in the housing.

The effect of the drill bit being a hole saw, is that a hole may be provided that has a larger diameter than when using compact drill bits. The hole saw can be externally supported.

The slip clutch can comprise a spring housing which is rotationally rigidly and displaceably connected to the drive shaft, a clutch element which is rotationally rigidly and axially displaceably connected to the actuator, at least one spring which on a first end abuts the spring housing and on a second opposite end abuts a friction element arranged to engage with the clutch element. The clutch element can be connected to the actuator via a sleeve. The clutch element can comprise an annular collar. The friction element can be shaped like an annular disk. An inner radial surface belonging to the friction element can be arranged to surround an external radial portion belonging to the friction element. Thereby the clutch element can provide an axial support and a radial support for the friction element.

The slip clutch described herein has the effect that the maximum torque which can be transferred, can be regulated by using one or more springs with a different spring constant.

The effect of the spring housing being axially displaceable, is that the force that the springs apply to the friction element can be regulated between a smallest force and a largest force. The more the at least one spring is pressed together, the greater is the moment the at least one spring can transfer.

The spring housing can comprise one or more recesses for a corresponding number of springs. A slip clutch with for example six springs can have a spring housing with six corresponding recesses for the springs.

If what is desired is to transfer a small torque, a few springs and/or springs with a small spring constant may be used. If what is desired is to transfer a large torque, more springs and/or springs with a large spring constant may be used. In an alternative embodiment, one or several disk springs may be used.

The device can comprise a second actuator arranged to displace a tightening element of the slip clutch, and wherein the second actuator is operated from an outside of the housing.

The effect of the second actuator being able to displace the tightening element of the slip clutch, is that the slip clutch's reduced torque can be easily and ergonomically regulated from the outside of the housing. That makes it possible to adjust and adapt the torque when the apparatus is in use. By being able to set the torque when the drive shaft rotates, it becomes easy for the user to find the optimal torque and feed rate. When drilling, the housing will typically rest in the operator's hand, and the moment can thereby easily be regulated by twisting the hand without having to change grip.

The torque may be set when the drive shaft is rotating. The torque can be set when the drive shaft is not rotating.

The second actuator can comprise a ring which is rotatable about an external portion of the housing, and provided with an inner threaded portion which corresponds to an outer threaded portion belonging to the housing, the axially displaceable tightening element inside the housing and a connection element for connection of the ring and the tightening element. The connection element can be a set screw.

The connection element is fixed to the tightening element. The connection element can be displaced along an axial groove in the housing. An outer portion of the connection element projects out from the housing. The ring can comprise an inner radial groove which houses the outer portion of the connection element.

When the ring is rotated and thereby displaced in an axial direction, a middle portion of the connection element will slide in the groove in the housing at the same time as the connection element's outer portion is displaced along the groove in the ring. Because the connection element is fixed to the tightening element, the tightening element will be displaced correspondingly to the connection element.

The ring can comprise a recess arranged to guide the connection element through the ring and into the tightening element. When mounting and dismounting the connection element, the ring's recess must be positioned over the recess in the housing.

In an alternative embodiment, the second actuator can comprise a pawl arranged to displace the tightening element. The pawl can be rotatable about a shaft positioned on the outside of the housing, wherein the center axis of the shaft is arranged perpendicular to the center axis of the housing. A first end portion of the pawl can engage with the tightening element. A second and opposite end portion of the pawl can protrude out of the housing so that it may be displaced in a first or a second direction.

The tightening element inside the housing is arranged to apply an axial force to the slip clutch and thereby regulate the torque that can be transferred via the slip clutch. The axial displacement of the tightening element is provided by the external ring pushing the tightening element in a first direction or in a second direction.

6

BRIEF DESCRIPTION OF THE DRAWINGS

In the following, an example is described of a preferred embodiment which is illustrated in the attached drawings, wherein.

DETAILED DESCRIPTION OF THE DRAWINGS

The figures are shown in a simplified and schematic manner. Details that are not important for highlighting what is new with the invention, may have been left out of the figures. The different elements in the figures are not necessarily shown in correct scale in relation to each other. Similar and corresponding elements will be specified using the same reference numbers in the figures.

In the following, to rotate can be understood as a rotation about a center axis C which is coaxial to a drive shaft 16 and a housing 11 which surrounds the drive shaft 16.

In the following, "axially" and "an axial direction" can be understood as a direction which coincides with the center axis C.

Herein, rotationally rigidly rotatably connected can be understood as a first element which is coupled to a second element so that the first and the second element rotate together.

Herein, rotationally rigidly displaceable can be understood as a first element which is coupled to a second element so that the first and the second element rotate together, but wherein the first and the second element are axially displaceable in relation to each other.

Figure 1:
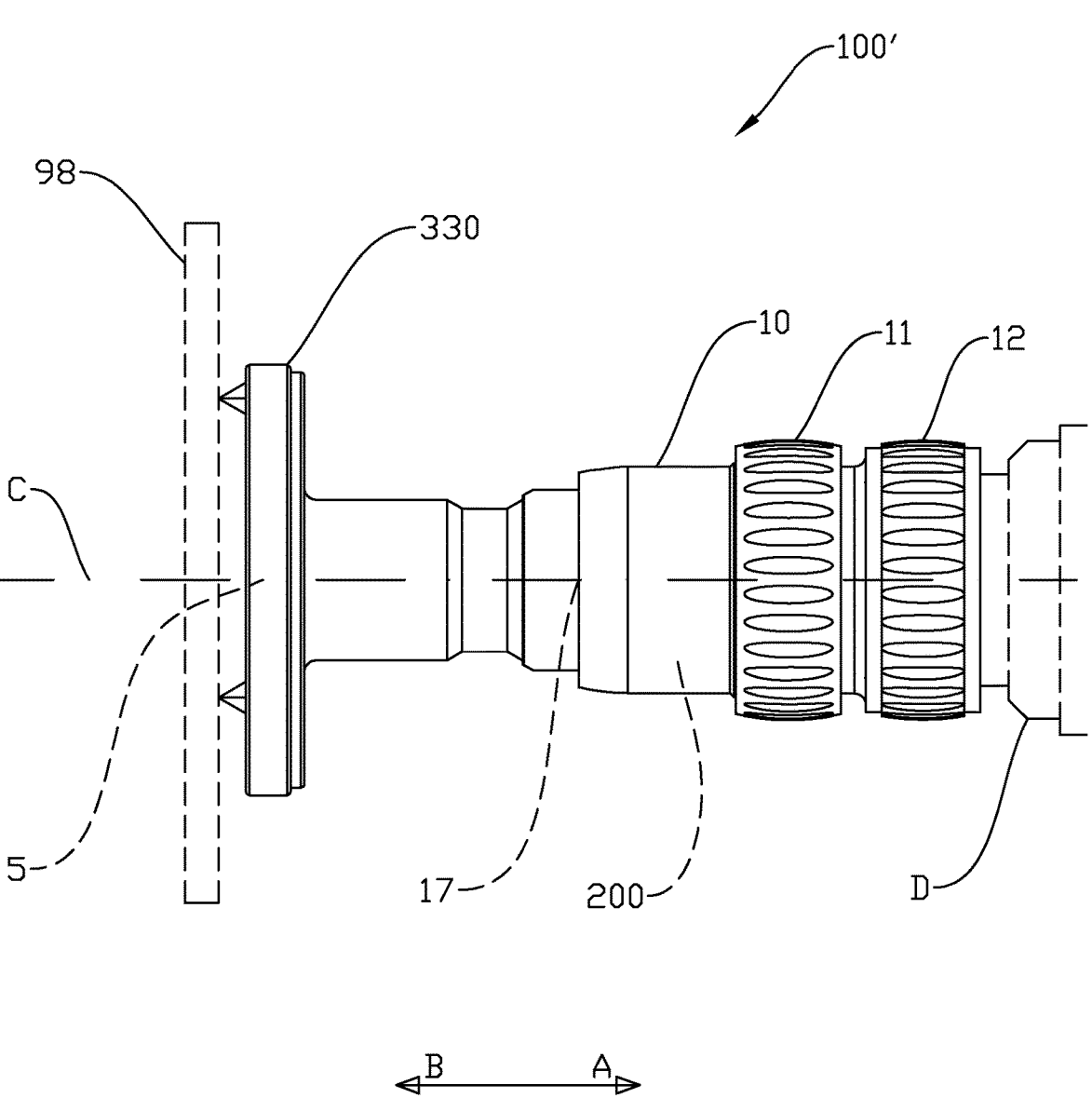
FIG. 1 shows a first embodiment of an apparatus for hole drilling for a hand-held drill, wherein the apparatus comprises a device for axial displacement of the hole saw.
Figure 2:
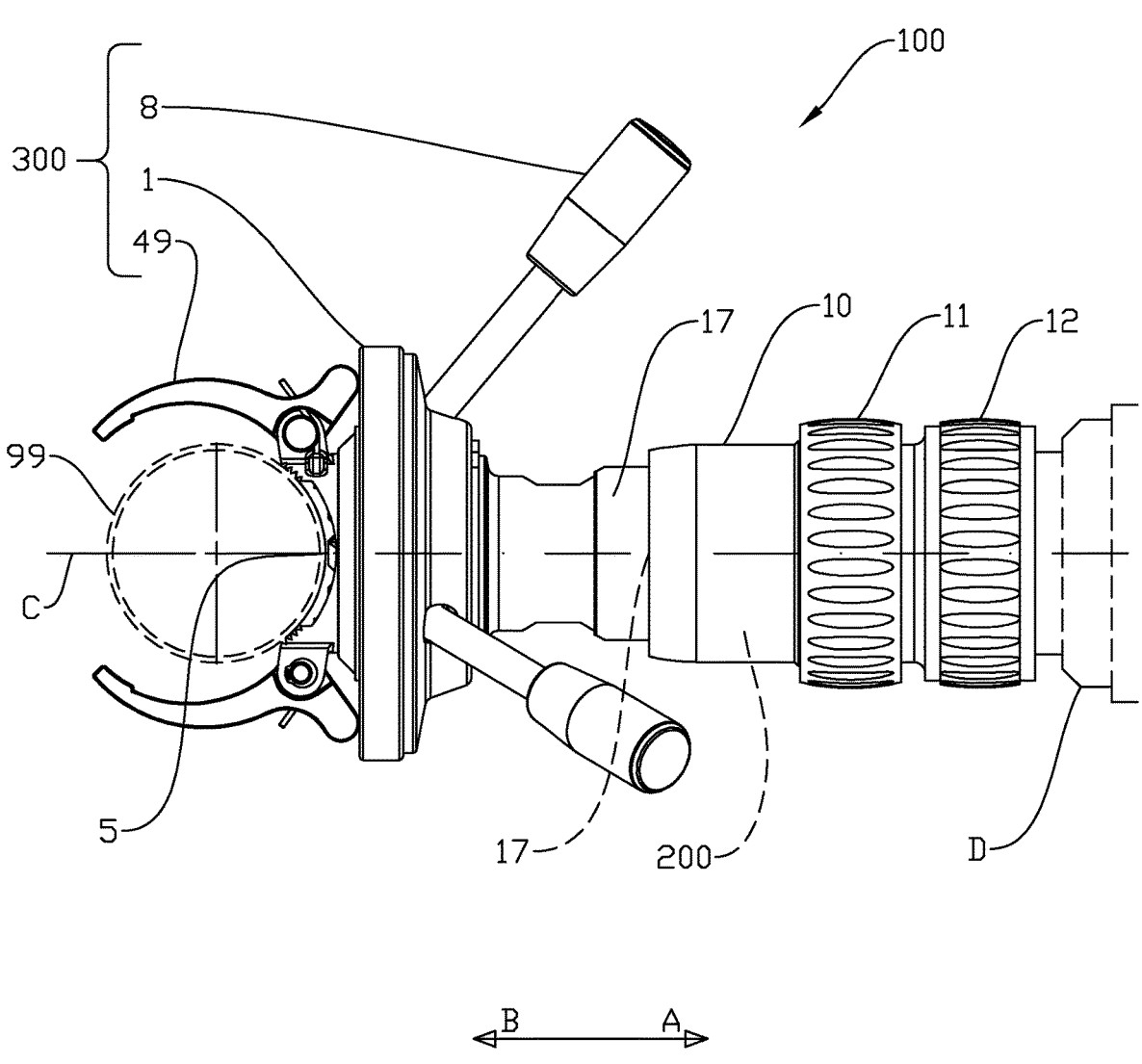
FIG. 2 shows a second embodiment of an apparatus for hole drilling for a hand-held drill, wherein the apparatus comprises a device for axial displacement of the hole saw.

FIGS. 1 and 2 show an apparatus 100, 100' for holing with a hand-held drill D, wherein the apparatus 100, 100' comprises a hole saw 5 without a center drill bit.

FIG. 1 shows the apparatus 100' arranged for holing in a level body 98. The apparatus 100' is shown with an installation 330 for keeping the apparatus 100' stable on the level body 98.

FIG. 2 shows the apparatus 100 arranged for hole-making in an elongated tubular body 99. The apparatus 100 is shown with a fixturing device 300 for hole-making in the elongated tubular body 99. The fixturing device 300 comprises a gripper device 49 which may be rearranged between a closed and an open position (shown in FIG. 2) with an actuator 1 comprising a plurality of handles 8.

FIGS. 1 and 2 further show a housing 10, a first actuator ring 11 for setting a torque for a slip clutch 200 which is positioned inside the housing 10. The slip clutch 200 is connected to an actuator 17 arranged for displacing the hole saw 5 in an axial direction A-B. A locking ring 12 is arranged to lock the apparatus 100, 100' to the drill D.

Figure 3:
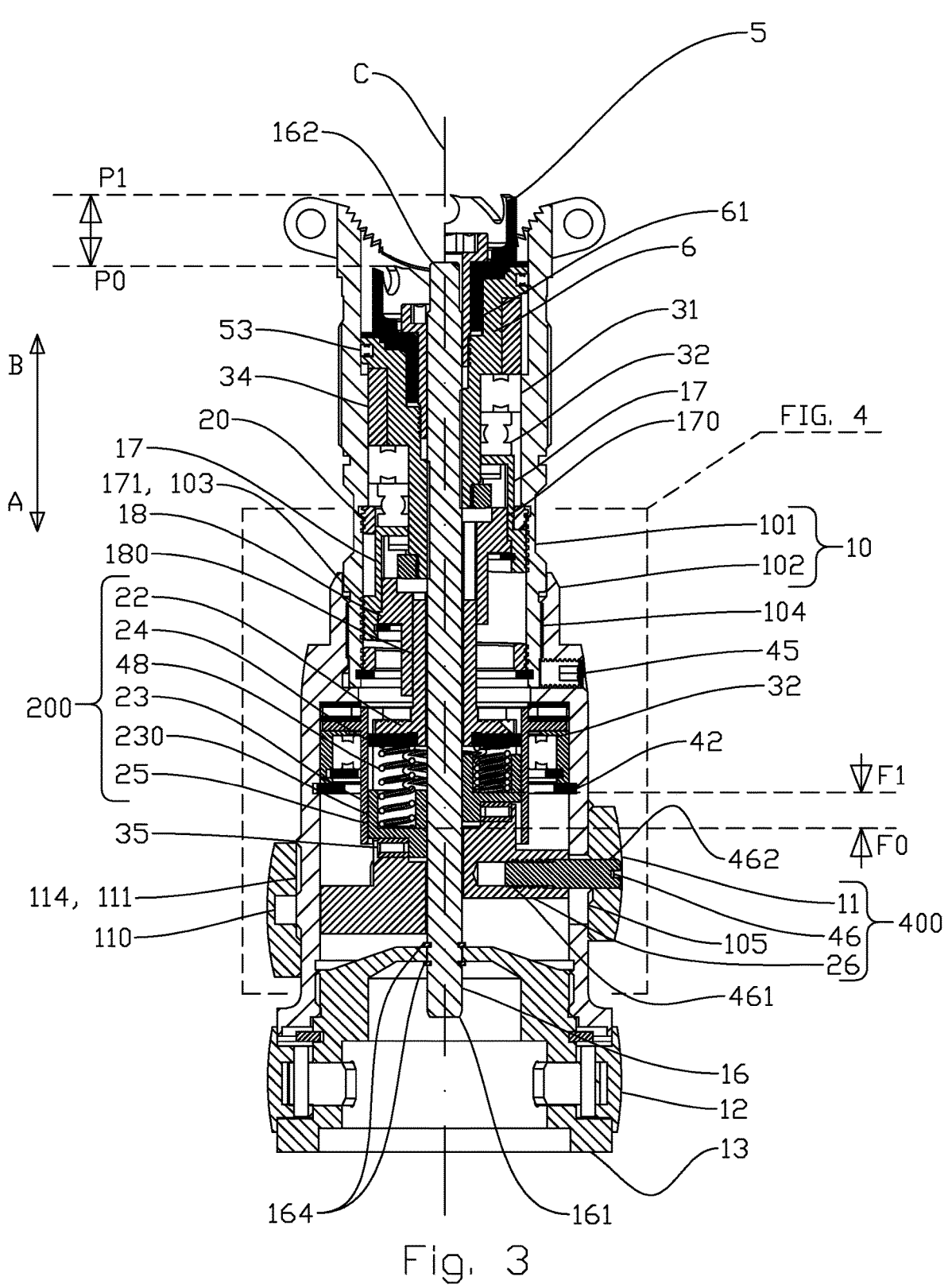
FIG. 3 shows a simplified view of FIG. 2.
Figure 4:
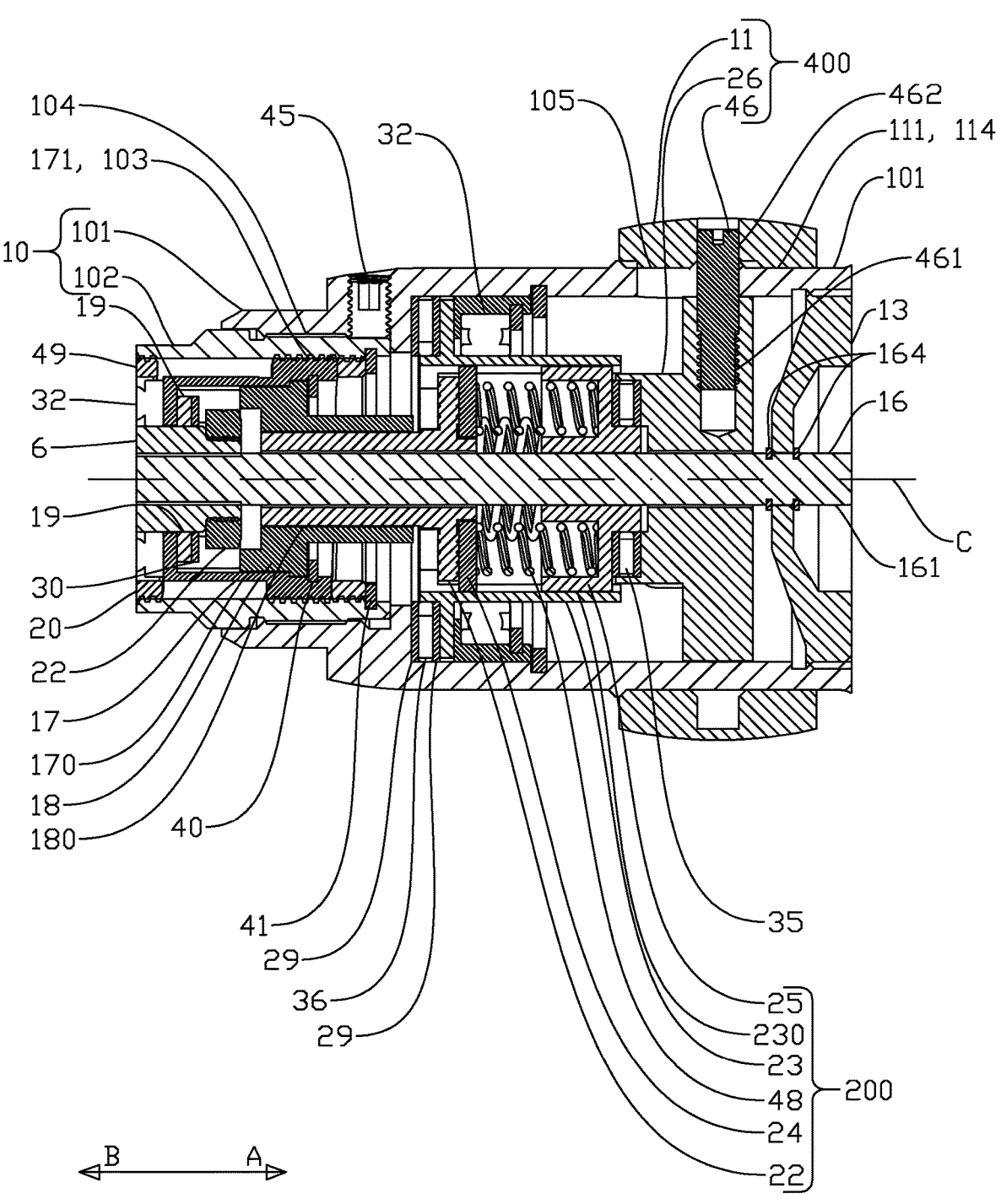
FIG. 4 shows a section of FIG. 3 in a larger scale.
Figure 5:
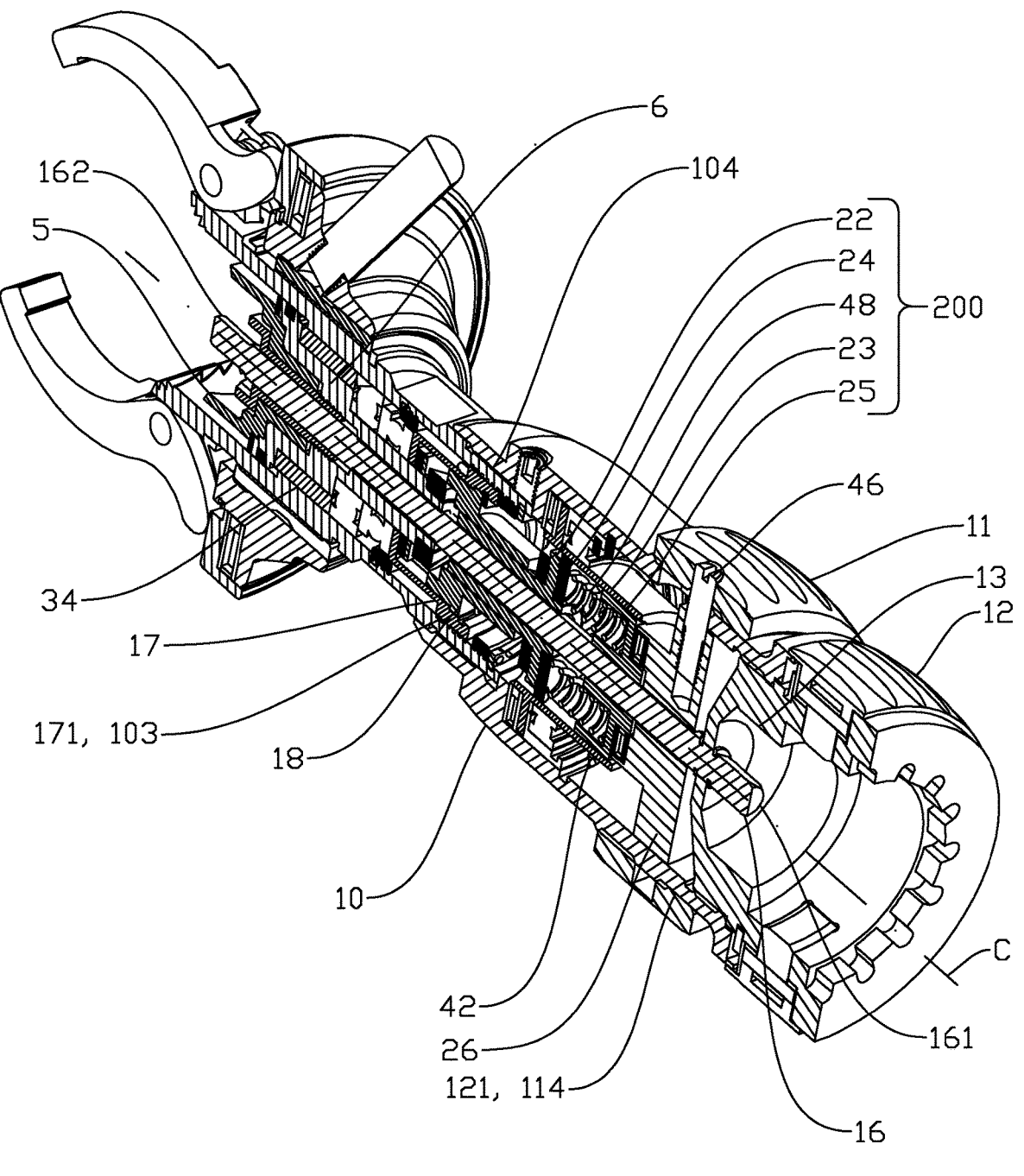
FIG. 5 shows FIG. 3 in perspective.

Reference is then made to the FIGS. 3, 4 and 5, which show views of the apparatus 100 along the center axis C, and in different scales and sections. In FIG. 3, parts of the fixturing device 300 shown in FIGS. 2 and 5 are removed to better illustrate the invention. In FIG. 5, only selected main components have been given reference numbers.

On the right half of FIG. 3, the actuator 17 and the hole saw 5 is shown in a drilling position P1.

On the left half of FIG. 3, the actuator 17 and the hole saw 5 is shown in a non-drilling position P0.

The following main components can be axially displaced between positions P0 and P1:

The hole saw 5, the actuator 17, a coupling sleeve 62, a radial bearing 34 (shown as a needle bearing), a radial bearing 31 (shown as a ball bearing) and an axial bearing 32 (shown as a ball bearing).

Attention is drawn to the fact that all shown bearings, guides and support rings are examples, and can be replaced by other types of bearings and guides.

The housing 10 is shown as a two-part housing with a first part 101 which is screwed together with a second part 102 via a corresponding threaded portion 104. A connection element 46, shown as a set screw in the figures, locks the second part 102 to the first part 101.

The drive shaft 16 with a first end 161 and an opposite second end 162 extends through a portion of the housing 10. The first end 161 is arranged for connection to the drill D. The drive shaft 16 is formed with a polygonal cross-section. A hexagonal cross-section is shown in the figures. Two locking rings 164 lock the drive shaft 16 axially to a drill coupling 13.

The hole saw 5 is coupled to the drive shaft 16 on the drive shaft's second end 162. The hole saw 5 is axially displaceably and rotationally rigidly connected to the drive shaft 16. FIGS. 3-5 show that the hole saw 5 is connected to the drive shaft 16 via a support sleeve 61 on the inside of the hole saw 5 and a feed sleeve 6 on the outside of the hole saw 5. The support sleeve 61 and the feed sleeve 6 are rotationally rigidly and displaceably connected to the drive shaft 16.

The feed sleeve 6 is externally supported on the housing 10 via a plurality of bearings. FIGS. 3-5 show a needle bearing 34 and a plurality of ball bearings, 53, 32 and 31. The bearings 34, 31 and 32 can be axially displaced in the housing 10 together with the hole saw 5.

An actuator 17 is axially rotatably connected to the feed sleeve 6. The actuator 17 can rotate freely about the drive shaft 16 and in relation to the support sleeve 61. The actuator 17 comprises an outer threaded portion 171 which corresponds to an inner threaded portion 103 in the housing 10 so that the actuator 17, the feed sleeve 6, the support sleeve 61 and the hole saw 5 are axially displaced along the drive shaft 16 when the actuator 17 rotates relative to the housing 10.

The actuator 17 is rotationally rigidly connected to a coupling sleeve 18, and the actuator 17 and the coupling sleeve 18 can be axially displaced in relation to each other via one or more axial grooves 170, for example a spline connection.

The coupling sleeve 18 is further rotationally rigidly and axially displaceably connected to a clutch element 22 belonging to a slip clutch 200 via a spline connection 180.

The slip clutch 200 comprises a clutch element 22, a spring housing 25, a clutch housing 23, at least one spring 48 and a friction element 24. FIGS. 3-5 show a slip clutch 200 with six springs 48. The spring housing 25 is shown with six recesses for the springs 48.

A first end of the springs 48 is received by the six recesses in the spring housing 25. A second, opposite end of the springs 48 abuts the friction element 24. The opposite side of the friction element 24 abuts the clutch element 22.

The spring housing 25 is rotatably rigidly and axially displaceably connected to the drive shaft 16 so that the spring housing 25 and the springs 48 rotate together with the drive shaft 16. The spring housing 25 and the clutch housing 23 are axially displaceable in relation to each other via a spline connection 230. Via the spline connection 230 a torque can be transferred between the clutch housing 23 and the spring housing 25.

The clutch housing 23 is externally supported on an inside of the housing's first part 101. In FIGS. 3-5, the support comprises a ball bearing 32. The clutch housing 23 can rotate relative to the housing 10 and about the drive shaft 16. An inner collar in the first part 101 of the housing and a locking ring 42 hold the clutch housing 23 in a fixed axial position in relation to the housing 10.

The spring housing 25 is axially displaceable along the drive shaft 16 between a neutral first position F0 and an active second position F1.

In the neutral first position F0, the springs 48 and the friction element 24 are partially or entirely non-loaded so that the friction element 24 does not transfer any moment to the clutch element 22. When the drive shaft 16 rotates, the spring housing 25, the springs 48 and the clutch housing 23 will also rotate, but not the clutch element 22.

By displacing the spring housing 25 in an axial direction B from the neutral first position F0 and towards the active second position F1, the springs 48 will be pressed against the friction element 24 and apply a force to the friction element 24 so that a torque is provided between the friction element 24 and the clutch element 22 so that the clutch element 22 rotates. Because the clutch element 22 is rotatably connected to the actuator 17 via the sleeve 18, the actuator 17 will also rotate. When the actuator 17 rotates, the threaded connection 171 between the actuator 17 and the housing 10 will provide an axial displacement of the actuator 17, the feed sleeve 6 and the hole saw 5 in the axial direction B.

The axial displacement of the actuator 17 is limited by the length of the threaded portion 103. A stopper 20 ensures that the actuator's 17 threads are not displaced beyond the threaded portion 103.

The clutch element's 22 rotational speed and thereby the actuator's 17 linear movement speed is affected by the size of the torque that is transferred from the friction element 24 to the clutch element 22 and the load on the hole saw 5.

A large torque and a small load on the hole saw 5 will lead to a quick displacement of the hole saw 5. A small torque and a large load on the hole saw 5 will lead to a slow displacement of the hole saw 5.

If the hole saw 5 rotates with little to no resistance, the actuator 17 will displace the hole saw 5 from a non-cutting position P0 to a cutting position P1. When the hole saw is in the cutting position P1, the clutch element's 22 rotation about the drive shaft 16 will end, even if the drive shaft 16 and the hole saw 5 are rotating. Because the spring housing 25 and the clutch housing 23 rotate together with the drive shaft 16, the friction element 24 will slip against the clutch element 22. To avoid overheating, the slip clutch 200 can comprise a fluid for cooling, for example oil (not shown).

If the hole saw 5 rotates with a large resistance, a greater moment between the friction element 24 and the clutch element 22 will be required for the clutch element 22 to rotate than when the hole saw 5 rotates with little resistance.

As the hole saw 5 cuts through the surface, for example the pipe 99 shown in FIG. 1, an adequate moment will be provided to displace the hole saw 5 through the surface. When a constant moment is transferred, the hole saw 5 will cut through the pipe 99 with a maximal force and speed in relation to the moment.

By changing the rotation direction of the drive shaft 16, the clutch element 22 and the actuator 17 will rotate the opposite way and thereby pull the hole saw 5 from the cutting position P1 to the neutral position P0.

The spring housing's 25 axial displacement is provided by means of a second actuator 400 comprising a rotatable ring 11 which surrounds a portion of the housing 10, an inner tightening element 26 and a set screw 46 with a first end 461 arranged to engage with the tightening element 26 and a second end 462 arranged to engage with an inner radial groove 110 in the ring 11. The ring 11 is provided with an inner threaded portion 111 which corresponds to an outer threaded portion 114 on the housing 10 and a recess arranged to guide the set screw 46 into the tightening element 26 and the groove 110. The set screw 46 can be displaced along an axial groove 105 in the housing.

When the ring 11 rotates, the ring 11 will be displaced in an axial direction A or B. The set screw's 46 second end 462 is engaged with the inner groove 110, and will thereby be displaced axially in the groove 105, and displace the tightening element 26 correspondingly. When the ring 11 and the tightening element 26 are displaced towards the springs 48 in direction B, the springs 48 will press against the friction element 24 so that a moment can be transferred between the friction element 24 and the clutch element 22. The further the tightening element 26 is displaced in direction B, the larger a moment can be transferred.

When the ring is displaced in an opposite direction A, the tightening element 26 will be displaced away from the springs and the moment that can be transferred is reduced.

It should be noted that all embodiments mentioned above illustrate the invention, but do not delimit it, and experts on the area will be able to design many alternative embodiments without deviating from the scope of the attached claims. In the claims, the reference numbers in parenthesis shall not be considered delimiting.

The use of the verb "to comprise" and its different forms does not exclude the presence of elements or steps not mentioned in the claims. The indefinite articles "a" or "an" before an element do not exclude the presence of more such elements.

The fact that some features are specified in mutually different dependent claims does not indicate that a combination of these features cannot be used advantageously.

The invention claimed is:

1. A device for an axial displacement of a hole saw for a hand-held drill, wherein;

the hole saw is without a center drill bit, and is coupled directly to the drill via a drive shaft which on a first end is arranged for connection to the drill and on a second end is arranged for connection to the hole saw for thereby providing a direct transfer of a torque and an rpm from the drill to the hole saw;

the hole saw and an actuator are rotatably connected and positioned within a housing;

the device is provided with a coupling for the drill;

the actuator comprises an outer threaded portion which corresponds to an inner threaded portion in the housing so that the actuator and the hole saw are displaced axially along the drive shaft when the actuator rotates relative to the housing;

wherein;

the actuator is connected to the drive shaft via a slip clutch arranged to transfer a reduced rpm and torque from the drive shaft to the actuator, and the slip clutch encircles the drive shaft.

2. The device according to claim 1, wherein the slip clutch comprises:

a spring housing which is rotatably rigidly and displaceably connected to the drive shaft;

a clutch element which is rotatably rigidly and axially displaceably connected to the actuator; and at least one spring which on a first end abuts the spring housing and on a second opposite end abuts a friction element arranged to engage with the clutch element.

3. The device according to claim 2, wherein the device comprises a second actuator arranged to displace a tightening element for the slip clutch, the second actuator is arranged to be operated from an outside of the housing, and wherein the second actuator is axially displaceable along the housing.

4. The device according to claim 1, wherein the actuator is axially displaceable with respect to the housing.

5. The device according to claim 1, wherein the device comprises a second actuator arranged to displace a tightening element for the slip clutch, the second actuator is arranged to be operated from an outside of the housing, and wherein the second actuator is axially displaceable along the housing.

6. The device according to claim 5, wherein the second actuator comprises:

a ring which is rotatable about an external portion of the housing and encircling the drive shaft, and the ring is provided with an inner threaded portion which corresponds to an outer threaded portion on the housing;

the tightening element inside the housing, wherein the tightening element is axially displaceable relative to the housing; and a connection element for connection of the ring and the tightening element.

7. A device for an axial displacement of a hole saw for a hand-held drill, wherein;

the hole saw is without a center drill bit, and is coupled directly to the drill via a drive shaft which on a first end is arranged for connection to the drill and on a second end is arranged for connection to the hole saw for thereby providing a direct transfer of a torque and an rpm from the drill to the hole saw;

the hole saw and an actuator are rotatably connected and positioned within a housing;

the device is provided with a coupling for the drill;

the actuator comprises an outer threaded portion which corresponds to an inner threaded portion in the housing so that the actuator and the hole saw are displaced axially along the drive shaft when the actuator rotates relative to the housing;

wherein;

the actuator is connected to the drive shaft via a slip clutch arranged to transfer a reduced rpm and torque from the drive shaft to the actuator, and the slip clutch encircles the drive shaft; and wherein;

the device comprises a second actuator arranged to displace a tightening element for the slip clutch, the second actuator is arranged to be operated from an outside of the housing, and wherein the second actuator is axially displaceable along the housing.

8. The device according to claim 7, wherein the second actuator comprises:

a ring which is rotatable about an external portion of the housing and encircling the drive shaft, and the ring is provided with an inner threaded portion which corresponds to an outer threaded portion on the housing;

the tightening element inside the housing, wherein the tightening element is axially displaceable relative to the housing; and a connection element for connection of the ring and the tightening element.

9. The device according to claim 7, wherein the slip clutch comprises:

a spring housing which is rotatably rigidly and displaceably connected to the drive shaft;

a clutch element which is rotatably rigidly and axially displaceably connected to the actuator; and at least one spring which on a first end abuts the spring housing and on a second opposite end abuts a friction element arranged to engage with the clutch element.

10. The device according to claim 7, wherein the actuator is axially displaceable with respect to the housing.

11. A device for an axial displacement of a hole saw for a hand-held drill, wherein;

the hole saw is without a center drill bit, and is coupled directly to the drill via a drive shaft which on a first end is arranged for connection to the drill and on a second end is arranged for connection to the hole saw for thereby providing a direct transfer of a torque and an rpm from the drill to the hole saw;

the hole saw and an actuator are rotatably connected and positioned within a housing;

the device is provided with a coupling for the drill;

the actuator comprises an outer threaded portion which corresponds to an inner threaded portion in the housing so that the actuator and the hole saw are displaced axially along the drive shaft when the actuator rotates relative to the housing;

wherein;

the actuator is connected to the drive shaft via a slip clutch arranged to transfer a reduced rpm and torque from the drive shaft to the actuator, and the slip clutch encircles the drive shaft, wherein the slip clutch comprises:

a spring housing which is rotatably rigidly and displaceably connected to the drive shaft;

a clutch element which is rotatably rigidly and axially displaceably connected to the actuator; and at least one spring which on a first end abuts the spring housing and on a second opposite end abuts a friction element arranged to engage with the clutch element.

12. The device according to claim 11, wherein the device comprises a second actuator arranged to displace a tightening element for the slip clutch, the second actuator is arranged to be operated from an outside of the housing, and wherein the second actuator is axially displaceable along the housing.

13. The device according to claim 12, wherein the second actuator comprises:

a ring which is rotatable about an external portion of the housing and encircling the drive shaft, and the ring is provided with an inner threaded portion which corresponds to an outer threaded portion on the housing;

the tightening element inside the housing; and a connection element for connection of the ring and the tightening element.

14. The device according to claim 11, wherein the actuator is axially displaceable with respect to the housing.

*    *    *    *    *